United States Patent Office 2,751,798
Patented June 26, 1956

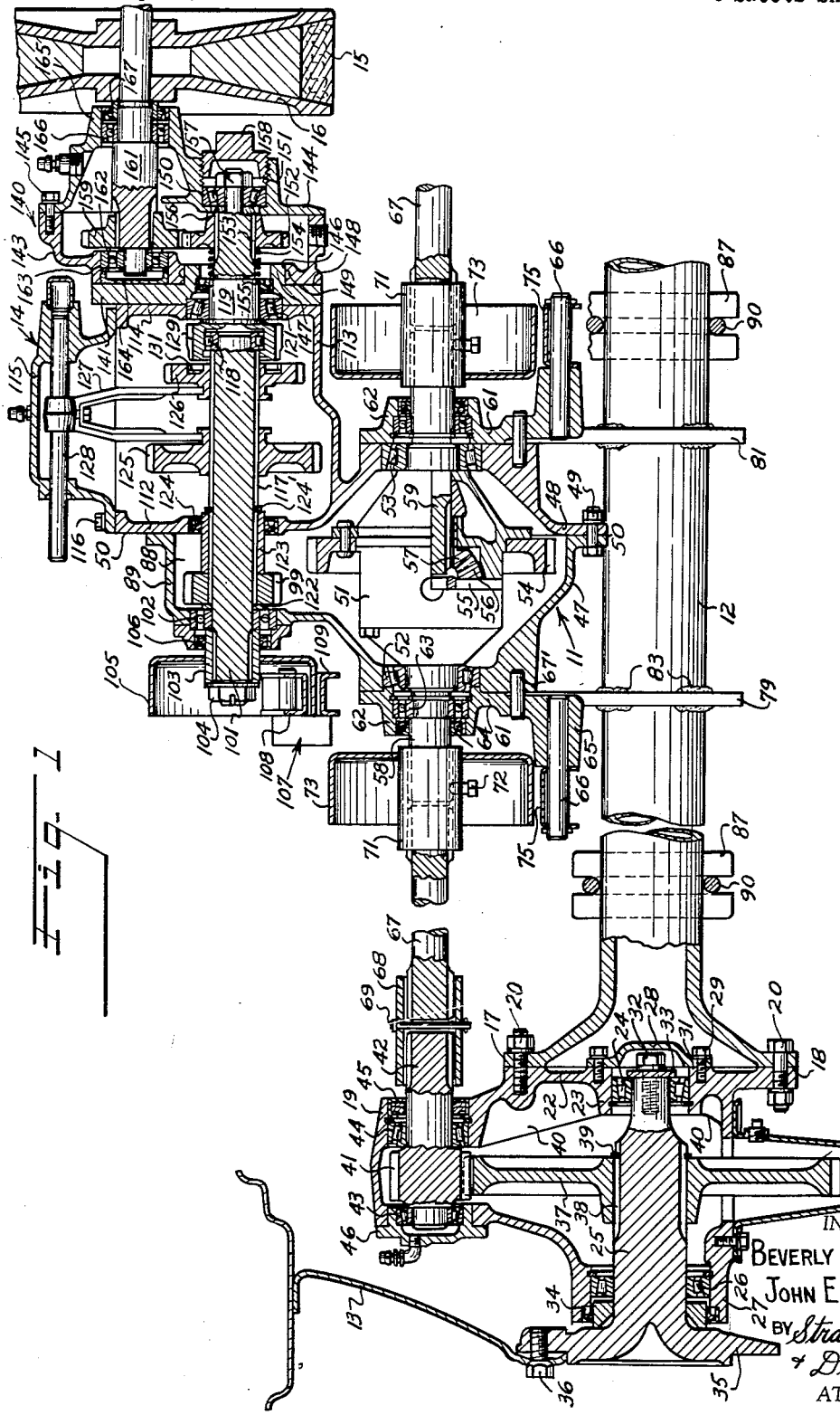

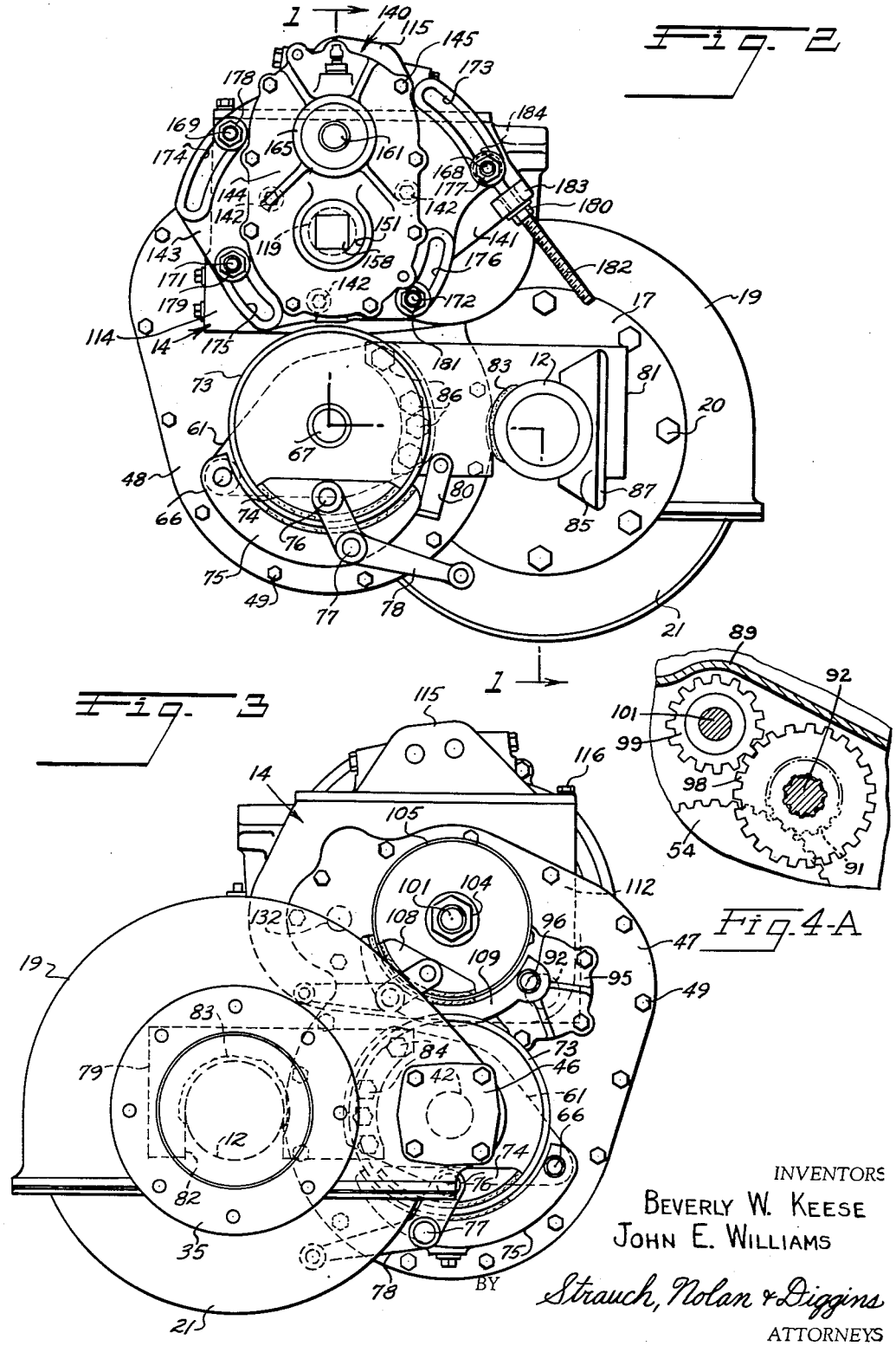

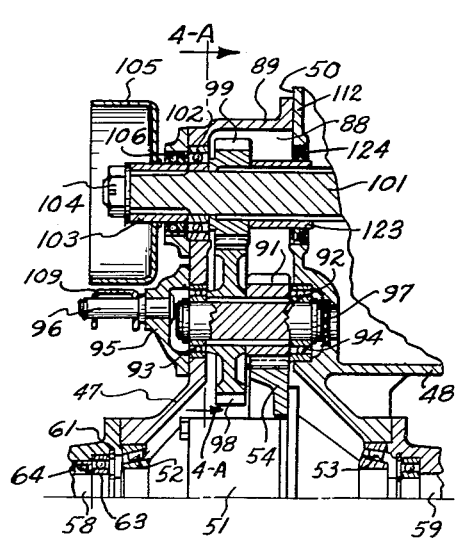
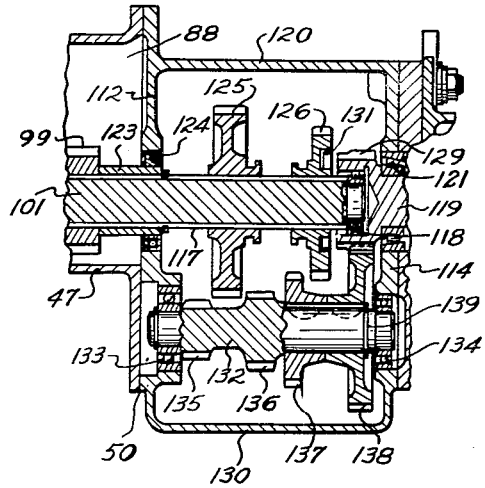
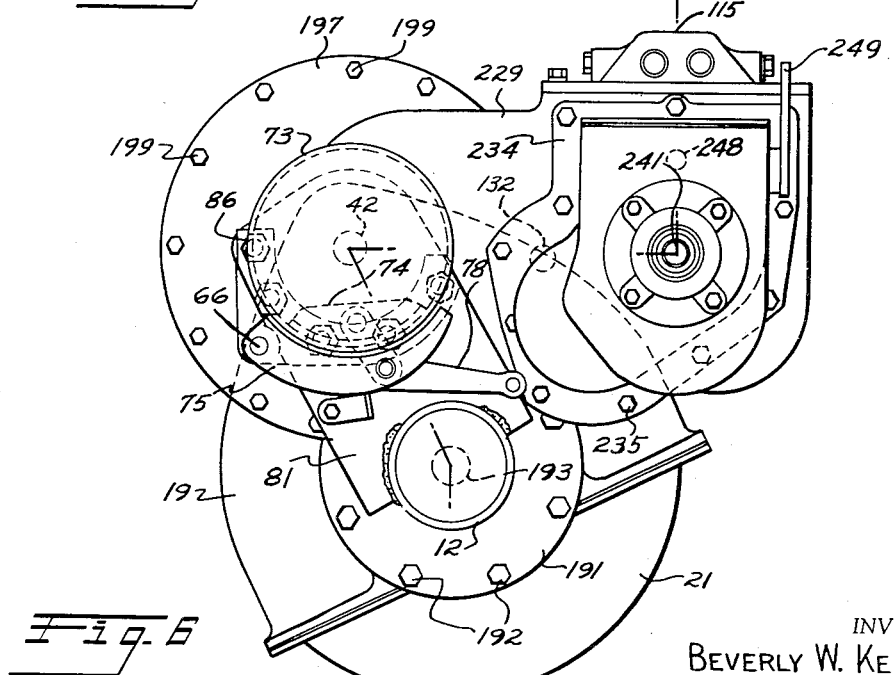

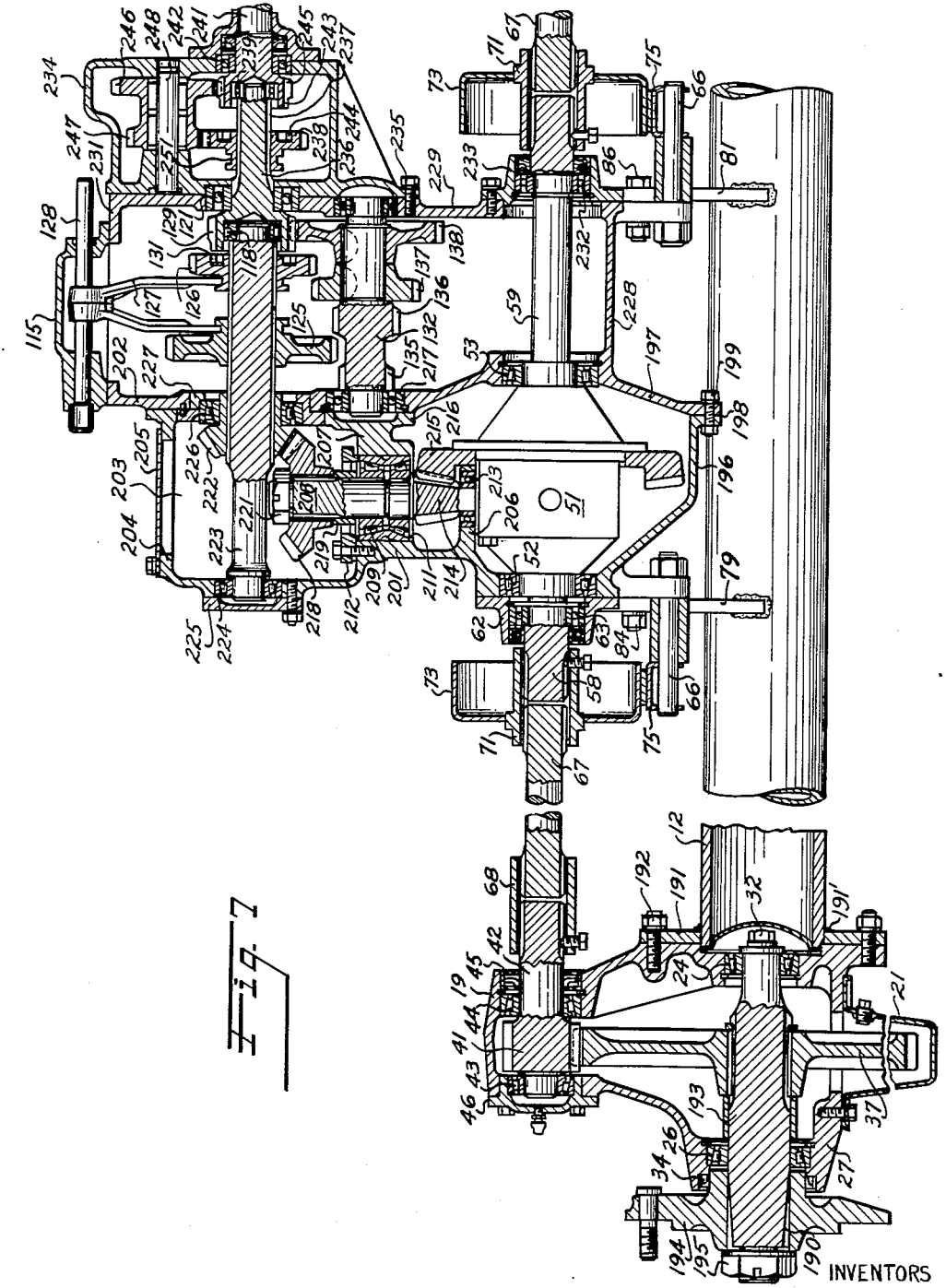

2,751,798

HOUSING STRUCTURE FOR DRIVE AXLE MECHANISM

Beverly W. Keese and John E. Williams, Oshkosh, Wis., assignors, by mesne assignments, to Rockwell Spring and Axle Company, Coraopolis, Pa., a corporation of Pennsylvania Application July 21, 1950, Serial No. 175,146

2 Claims. (Cl. 74—606)

This invention relates to vehicle drive mechanisms and particularly to such mechanisms for heavy duty farm combine machines wherein the parts are arranged in novel association for improved operating efficiency and availability for repair and replacement.

In many farm vehicles in use today, gear reduction housings are mounted near the wheels at opposite sides of the tractor or other machine. Our invention embodies an improved construction wherein stub axles for the wheels journaled in such housings are concentric with a sturdy load carrying frame cross tube which connects the outer gear reduction housings and also supports the drive axle and transmission units. Our invention also contemplates improved mechanism housing constructions wherein the transmission housing is integral with one part of a split axle housing. A novel arrangement of intermediate gear reductions and other drive features are also embodied, including a novel belt drive tightening adjustment, all as will be pointed out in detail.

It is therefore a major object of our invention to provide a novel vehicle drive mechanism wherein the various gears and shafts are supported in special housing structures and in novel compact association for efficient operation and ease of availability for repair and replacement.

A further object of the invention is to provide a vehicle drive mechanism embodying a novel mounting of gear reduction housings on the frame. Pursuant to this object these housings are mounted on the frame to locate the wheel stub axles substantially concentric with a sturdy frame cross tube.

It is a further object of the invention to provide a novel drive mechanism housing structure wherein the transmission housing and drive axle housing are integrally connected.

A further object of the invention is to provide a novel vehicle drive mechanism having a spur gear double reduction between a variable speed transmission and a final drive axle assembly.

A further object of our invention is to provide a novel association of a first gear reduction housing and transmission housing wherein the former may be adjusted to tighten a belt and pully drive to its input shaft.

It is a further object of the invention to provide a novel substitutable gear reduction arrangement in a farm vehicle for relating the drive to different tire sizes to suit different traction and field conditions.

A further object of our invention is to provide in a vehicle, a novel disconnectable drive shaft arrangement for disabling the drive to the wheels when the vehicle is being towed.

Further objects of the invention will appear as the description proceeds in connection with the appended claims and the annexed drawings wherein:

Figure 1 is a section along line 1—1 of the vehicle drive mechanism of Figure 2 illustrating the special support of the drive axle on the frame and the novel associated transmission and axle housing and gear arrangements of this embodiment of the invention;

Figure 2 is a side elevation of the drive mechanism as viewed from the right in Figure 1;

Figure 3 is a side elevation of the drive mechanism viewed from the side opposite Figure 2;

Figure 4 is a fragmentary sectional view illustrating the drive gearing to the differential;

Figure 4A is a section along line 4A—4A in Fig. 4 illustrating the gear arrangement in the reduction gear chamber;

Figure 5 is a fragmentary sectional view illustrating further details of the transmission gearing;

Figure 6 is a side elevation of a drive mechanism according to a further embodiment of the invention; and Figure 7 is a section along line 7—7 in Figure 6 illustrating the drive axle, transmission and support arrangements of the embodiment of Figure 6.

Referring now to Figures 1–5 wherein like reference characters indicate the same elements, the invention is illustrated in its preferred embodiment as incorporated in a farm combine wherein a transverse drive axle assembly 11 is mounted on a sturdy transverse cylindrical support tube 12. The drive axle assembly is drive connected at opposite ends to ground engaging wheels 13, and it is driven through a change speed transmission assembly 14 and suitable reduction gearing, the power from an engine drive shaft on the tractor hauling the combine being applied by a V-belt 15 to a pulley 16 operably connected to the transmission input, as will appear.

At its opposite ends, only one being shown in Figure 1, support tube 12 is smoothly flared outwardly to provide a conical section terminating in a concentric flange 17 having a flat vertical outer face 18. An integral cast reduction gear housing 19 having an annular flat face adapted to seat on face 18 is removably secured to flange 17 as by studs or bolts 20. The lower end of housing 19 is open, and a closure 21 is bolted or otherwise removably secured thereon to enable access to the reduction gearing through the bottom of housing 19.

Thus cross tube 12 which carries the entire weight of the combine is rigidly connected at opposite ends to gear reduction housings 19. The final reduction gears in housings 19 are mounted in a single cast structure thereby eliminating considerable machine work, locating dowels and the like.

Housing 19 is formed inwardly of its attachment to the support tube flange 17 with a web 22 having a central hollow boss 23. A suitable bearing assembly 24 within boss 23 supports the inner end of a wheel hub or stub shaft 25 that is supported near its outer end in a bearing assembly 26 mounted in a hollow boss 27 in the outer wall of housing 19 and concentric with boss 23 and tube 12. The inner end of boss 23 is closed by a cap 28 secured as by studs 29 upon an annular face 31 coplanar with flange face 18.

Bearing assembly 24 is preferably a tapered roller bearing providing both a radial and thrust bearing for the hub 25 and the reduced inner end of hub 25 which extends through bearing 24 to terminate inside cap 28 has secured to it as by stud 32 a thrust plate 33 abutting the bearing assembly and limiting outward radial movement of hub 25. Bearing assembly 26 is also a tapered roller bearing and a grease seal 34 is provided in the outer end of boss 27. Outwardly of seal 34 hub 25 is formed with an enlarged integral flange 35 to which wheel 13 is attached as by bolts 36.

Thus hub 25 is journalled in housing 19 and is concentric with tube 12. With hub 25 freely rotatably mounted in bearings 24 and 26, stud 32 is drawn tight to complete sub-assembly of the hub with housing 19 prior to mounting housing 19 on the support tube 12. At the other side of the combine the other wheel is mounted on a similarly journaled hub 25, both hubs 25 being concentric with the support tube.

Within housing 19 and about midway between bearings 24 and 26, a large spur gear 37 is splined otherwise non-rotatably secured upon hub 25 at 38, a lock ring 39 preventing axial separation of gear 37 and hub 25. Gear 37 is constantly meshed within housing 19 with a smaller spur gear 41 rigid and preferably integral with a short shaft 42 that is supported by bearing assemblies 43 and 44 mounted in opposite walls of housing 19. Both bearings 43 and 44 are tapered roller bearings, and a grease seal 45 closes housing 19 about the inwardly projecting end of shaft 42. A suitable cap 46 tightly closes the outer wall of housing 19.

The axis of rotation of shaft 42 is parallel to that of hub 25, and is disposed rearwardly of hub 25 in a horizontal plane containing both axes. Web 22 and boss 23 are reenforced by a series of internal radial webs 40 integral with housing 19.

The drive axle assembly 11 has an enlarged differential housing portion comprising two housing members 47 and 48 that are secured together as by bolts 49 along a vertical plane indicated at 50 and normal to the axes of rotation of hubs 25. A differential cage 51 has its opposite ends rotatably mounted in concentric tapered roller bearing assemblies 52 and 53 in the opposite walls of housing members 47 and 48 respectively. A spur gear 54 is riveted or otherwise rigidly secured to cage 51. Within cage 51 is mounted a conventional axle differential mechanism comprising a spider 55 clamped between the cage halves, and rotatable pinions 56 on the spider meshed with side gears 57. The two side gears 57 are splined upon shafts 58 and 59 that are coaxial and project oppositely from the axle housing.

A housing end member 61 having a hollow boss 62 coaxial with shaft 58 is secured upon housing member 47 to support a ball bearing assembly 63 for an intermediate portion of shaft 58. A suitable oil seal 64 surrounds shaft 58 where it emerges from boss 62. As illustrated in Figures 1 and 3, housing end member 61 is formed with a rearwardly projecting portion having an integral boss 65 in which is non-rotatably mounted a pivot pin 66 for a brake operator to be later described. A pilot pin 67', which projects through member 61 into a coacting bore in housing member 47 insures correct orientation of pivot pin 66 before members 61 and 47 are rigidly bolted together.

Coaxial shafts 42 and 58 are connected by an intermediate coaxial shaft 67. Shaft 42 is connected to shaft 67 by an internally splined coupling sleeve 68 which bridges their adjacent splined ends, and a diametral pin 69 projects through sleeve 68 between the shaft ends to prevent relative axial movement between the shafts and sleeve. A second internally splined coupling sleeve 71 bridges the adjacent splined ends of shafts 67 and 58, and a set screw 72 holds it against axial shift. Thus shaft 58 is drive connected to shaft 42 at the wheel, and when the vehicle is being towed this drive connection may be broken by pulling out pin 69 and sliding sleeve 68 to the right in Figure 1 to separate it from shaft 42. Moreover, by permitting some radial play in the splined connections between the sleeves and shafts, a limited universal drive connection is obtained at the coupling sleeves which compensates for possible small misalignments of shafts 42 and 58.

A brake drum 73 is preferably pressed or otherwise non-rotatably secured on sleeve 71. A brake shoe assembly comprising an inner shoe 74 and an outer shoe 75 are pivotally connected at 76 and 77 respectively to an actuating crank arm 78, the outer shoe 75 being pivoted about a fixed axis on pin 66. A stop 80 rigid with the axle housing limits movement of shoe 75 away from the drum. This brake assembly is substantially that of Rosenberg Patent 2,239,977 to which reference is made for any needed detail. The entire brake drum may be removed for repair or replacement merely by sliding sleeve 71 out of splined engagement with the drive shaft sections.

At the other side of the combine, shaft 59 is similarly connected to the gear reduction mechanism, so that both wheels are driven through the differential and the reduction gearings at 41, 37.

The axle housing assembly 11 is mounted on support tube 12 by means of two plate brackets 79 and 81. Bracket 79 has a cutaway portion 82 whereby it fits upon and partly about support tube 12 and it is non-rotatably secured to support tube 12 by welding indicated at 83. Referring to Figure 3, the rear end of bracket plate 79 is secured to axle housing member 47 by bolts 84. Plate bracket 81 is similarly cutaway at 85 as shown in Figure 2 to fit over and be welded to tube 12 and its rear end is bolted to housing member 48 at 86 as shown in Figure 2.

It will be observed that, as shown in Figures 2 and 3, the axle assembly is rigidly supported just rearwardly of the support tube 12, with the axes of hubs 25 and the axle shafts all in a common horizontal plane. This mounting arrangement of the axle assembly protects it against striking tree stumps and other objects in the path of the combine as these objects must first clear the rigid support.

Support bar 12 also carries three spaced brackets 87, preferably welded to it, that support suitable risers 90 to the platform and other structural parts of the combine. The center bracket 87 is substantially on the longitudinal centerline of the combine, and the other two are equally spaced along bar 12.

As illustrated in Figure 1, the walls of axle housing members 47 and 48 extend upwardly to define a reduction gear chamber 88 above the differential portion, the upper part of housing member 47 having an integral top wall 89 that is bolted to member 48 in the plane indicated at 50. Within chamber 88, as shown in Figure 4, ring gear 54 of the differential is meshed with a spur pinion 91 non-rotatably mounted on a short idler shaft 92 journaled at opposite ends in suitable bearings 93 and 94 in housing members 47 and 48 respectively. A cap 95 secured to housing member 47 over the end of shaft 92 also has non-rotatably mounted thereon a brake pivot pin 96 for a purpose to be described. The other end of shaft 92 is sealed by a disc 97 in an aligned opening in housing member 48.

A spur gear 98 non-rotatably secured on shaft 92 within chamber 88 is meshed with a spur gear 99 that is splined or otherwise non-rotatably secured upon the end of a transmission output shaft 101 that projects through chamber 88 and is journaled in housing member 47 by bearing assembly 102. A collar 103 splined upon the end of shaft 101 where it emerges from the housing is clamped axially to shaft 101 by the bolt and washer assembly at 104, and an emergency or parking brake drum 105 is secured upon collar 103 as by welding. A suitable oil seal 106 is provided around collar 103 where it extends through housing member 47. We have thereby provided a double reduction spur gear drive between the transmission output and the axle drive shafts, which is an entirely new and sturdy construction in such a vehicle.

A brake shoe assembly 107 like that on pin 66 is preferably pivoted on pin 96, the inner and outer shoes 108 and 109 being illustrated in Figure 1, and this shoe assembly similarly coacts with drum 105 and is operated by an actuator (not shown) like that at 78.

Axle housing member 48 is formed with an integral upwardly extending wall 112 that serves as one end wall of the housing for transmission assembly 14 and is formed with a laterally extending wall 113 that serves as the bottom wall of the transmission housing. Bottom wall 113 turns upwardly to provide an integral wall 114 parallel to wall 112 for serving as the other end wall of the transmission housing. The top of the transmission housing is closed by a cover wall 115 removably secured thereupon as by bolts 116. Transmission housing side walls 120 and 130 are integral with end walls 112 and 114 (Figure 4).

As illustrated in Figure 1, shaft 101 is splined at 117 for substantially its entire length and its end opposite bearing 102 is reduced and supported in a radial pilot bearing 118 in the end of a coaxial transmission input shaft 119 that is mounted in wall 114 by the tapered roller bearing assembly 121. Gear 99 is fixed against axial movement on shaft 101 by means of a groove and snap ring at 122 on one side and a splined collar 123 and coacting groove and snap ring at 124'. Collar 123 extends through a suitable opening in wall 112 containing an oil seal 124 surrounding the collar.

Gears 125 and 126, operated by a fork assembly 127 depending from a conventionally operated shifter rail 128, are slidably splined on shaft 101. The end of input shaft 119 within the transmission housing is formed with an integral spur gear 129 adapted to mesh with an internal gear 131 on gear 126 when the latter is shifted to the right in Figure 1, to provide a direct drive to output shaft 101.

Referring to Figure 5, a countershaft 132 parallel to shaft 101 is journaled at opposite ends in bearings 133 and 134 respectively in the end walls 112 and 114 of the transmission housing. Gears 135, 136, 137 and 138 of increasing size are rigid with shaft 132, gears 135 and 136 being integral with the shaft, and gears 137 and 138 being keyed to the shaft and axially held on it by a snap ring and groove at 139. Gear 138 is constantly in mesh with input shaft gear 129 so that countershaft 132 is continuously rotated. Thus gear 126 may be shifted to mesh gears 131 and 129 for direct drive as above pointed out, or may be meshed with gear 137 to provide lower speed drive of output shaft 101. A still lower speed drive is established by meshing gear 125 with gear 136, and when gear 125 is moved to the right in Figure 4 it is meshed with a reverse gear (not shown) but in mesh with gear 135.

A reduction gear housing 140 is mounted on a base plate 141 secured rigidly to the transmission housing as by bolts 142, and comprises a housing body 143 and a cover 144 secured to the body by bolts 145. As illustrated in Figure 1, housing body member 143 is formed with a cylindrical bore 146 that fits rotatably upon a cylindrical boss 147 projecting outwardly from a flat face 148 on plate 141. Bore 146 is formed with a continuous internal recess that is semi-circular in cross-section, for receiving a suitable packing 149. The plane of face 148 is perpendicular to the axes of shaft 119 which is coaxial with bore 146. Plate 141 is recessed to receive and abut the outer retainer ring of bearing 121.

The outer end of transmission input shaft 119 is mounted in a tapered roller bearing unit 150 in a bore 151 in housing cover 144. A spur gear 152 is splined non-rotatably and slidably on shaft 119 at 153 with the inner end of its hub in contact with a coiled compression spring 154 surrounding shaft 119 and seated on a shoulder 155 on shaft 119. A spacer ring 156 is mounted between the outer side of the hub of gear 152 and the inner race of bearing 150, and a nut 157 on the threaded reduced end of shaft 119 is drawn tight against the inner race of bearing 150. A threaded plug 158 seals the outer end of bore 151. Adjustment of nut 157 determines the axial position of gear 152 along shaft 119.

Gear 152 is in constant mesh with a spur gear 159 splined upon the inner end of a shaft 161 parallel to shaft 119 and supported in a bearing 162 in a bore 163 in housing member 143. Bore 163 is closed near surface 148 by a pressed metal cap 164. Shaft 161 projects through a hollow boss 165 in cover 144, being supported by a bearing unit 166 and surrounded by an oil seal 167. Pulley 16 is non-rotatably secured to shaft 161. The axes of shafts 161, 119, 101, 67 and 42 lie in a common vertical plane, and the axes of shafts 101, 119 and 132 lie in a common horizontal plane.

Housing 140 may be readily opened or even removed for repair and replacement of gears in the field.

Reduction gear housing 140 is mounted for rocking adjustment about the axis of boss 147. A series of rigid studs 168, 169, 171 and 172 projects from plate 141 through arcuate slots 173, 174, 175 and 176 formed in lateral web extensions of housing body member 143. Nuts 177, 178, 179 and 181 mounted on the studs maintain the housing at a desired angular position of rotation about the axis of shaft 119. A threaded rod 182 projecting freely through a lug 183 rigid with housing body member 143 has an inner end boss 184 swiveled on stud 168 beneath nut 177 and above the web of body member 143. With nuts 177—181 loosened, a nut 180 on rod 182 and in contact with lug 183 is turned to swing housing 140 bodily and thereby tighten belt 15.

The illustrated construction provides an angular adjustment range of housing 140 of 32° about the axis of shaft 119, merely by loosening nuts 177—181 and re-tightening them when the adjustment is complete. This adjustment is provided for the purpose of tightening the V-belt and pulley drive since it shifts shaft 161 and pulley 16 forwardly or rearwardly as desired. During this angular adjustment of housing 140, the gear 159 merely rolls along the periphery of gear 152 so that the drive relation remains unchanged.

Any suitable gear reduction may be provided at housing 140 simply by changing the gear pair 152, 159. In the illustrated embodiment this availability of several gear reduction ratios is made use of according to the size of the tires on wheels 13. For example, where 10" x 28" tires are employed, gear 159 has 25 teeth and gear 152 has 26 teeth, and a combination of gear 159 with 33 teeth and gear 152 with 18 teeth is used with 15" x 28" tires. Other gear pairs may be similarly correlated to the tire size in use.

Figures 6 and 7 illustrate a further embodiment of the invention having many features in common with Figures 1–5 but including different transmission input and output drive connections.

In this embodiment the cast reduction gear housings 19 are each removably secured upon the ends of a tubular horizontal cross member 12, as by a flange 191 welded as at 191' on tube 12 and studs 192 between the flange and housing. A stub shaft 193 is supported between bearings 24 and 26 in alignment with the axis of tube 12 and gear 37 is splined tightly on shaft 193 within housing 19. Wheel hub 194 is secured by a tapered spline connection 190 on the outer projecting end of shaft 193 and held thereon by a nut 195 threaded on the shaft end.

The axle assembly comprises two housing members 196 and 197 joined along a vertical plane indicated at 198 as by bolts 199. The differential cage assembly 51 is mounted in the axle assembly as in Figure 1. Housing members 196 and 197 extend to form walls of the transmission housing and an intermediate reduction gear chamber as in Figure 1 but are of somewhat different detailed construction.

Housing members 196 and 197 have rearwardly extending parallel walls 201 and 202 respectively serving as the side walls of a gear reduction chamber 203 having a top wall 204 integral with wall 201. A removable cover 205 closes an access opening in wall 204. Internally wall 201 is formed with inwardly projecting parallel webs 206 and 207. A pinion shaft 208 is journalled intermediate its ends in a bearing assembly 209 in web 207, this bearing being held in axially fixed position between a shoulder 211 and a removable retainer ring 212. The end of shaft 208 is supported in a bearing 213 in web 206, and the shaft is formed intermediate the webs with a bevel pinion 214 meshed with bevel ring gear 215 on the differential cage. The inner end of web 207 is braced against the inner surface of wall 202 and is enlarged at 216 to cover an aperture 217 leading into the transmission housing.

Within chamber 203 a bevel gear 218 is splined on shaft 208 and axially held between a spacer collar 219 and nut 221. Gear 218 is meshed with a bevel gear 222 fixed upon the splined transmission output shaft 223 which extends through chamber 203 to be supported in a bearing 224 in wall 201. The gear pairs 222, 218 and 214, 215 thus provide a double reduction drive between the transmission and differential. A removable cap 225 is mounted over the shaft end and bearing assembly. The hub of gear 222 is mounted in a bearing 226 in a collar 227 piloted in a suitable opening in wall 202.

The transmission housing in this embodiment is chiefly an integral casting with wall 202 serving as one end wall. The bottom wall 228 which is a lateral extension of housing member 197, the other end wall 229 which is parallel to wall 202, top wall 231 and the side walls (not shown) are integrally cast with housing member 197.

Thus a common feature between the Figure 1 and 7 embodiments is that the transmission housing, except for cover 115, is cast integral with one half of the axle housing members. In Figure 7, the axle drive shaft 59 extends through the lower end of the transmission housing, being supported in a bearing 232 in a removable collar 233 in wall 229.

Within the transmission housing gears 125 and 126 are slidably splined on shaft 223 which is similar to shaft 101, and coact with the various gears on countershaft 132 as in the embodiment of Figures 1–5.

The first reduction gear housing 234 is secured upon transmission housing wall 229 as by bolts 235, and it provides a two speed input to the transmission. It provides a very low added speed reduction without increasing the wheel base of the vehicle. A short shaft 236, corresponding to shaft 119 of Figure 1 and formed with gear 129 like shaft 119, supports the inner end of shaft 223 in bearing 118. Shaft 236 is splined at 237 for slidably mounting a gear 238. The outer end of shaft 236 is piloted in a bearing 239 in an input shaft 241 mounted in bearing 242 in the outer wall of housing 234.

The inner end of shaft 241 is formed with clutch teeth 243 for mesh with clutch teeth 244 on gear 238, and a spur gear 245 in constant mesh with a spur gear 246 which is integral with a smaller gear 247 and idly rotatable on a shaft 248 fixed to housing 234. Shaft 241 is driven by a belt and pulley arrangement as in the earlier embodiment. With the gears in the position of Figure 7, shaft 236 is driven at a reduced or so-called "creeper" speed by shaft 241 and gears 245, 246, 247 and 238. When gear 238 is shifted to mesh clutch teeth 243 and 244, shafts 241 and 236 are locked in direct drive. Gear 238 is shifted by a suitable rock lever 249 connected by mechanism (not shown) to groove 251 on gear 238. Where a creeper gear ratio is not desired, housing 234 and the shafts 241 and 248 and associated gears may be omitted and shaft 236 driven directly as in Figure 1.

Shafts 67, 223 and 241 lie in a common horizontal plane on opposite sides of a vertical plane through the axis of stub shaft 193, to provide a balanced weight on the cross tube 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, an axle housing comprising two housing members enlarged at adjacent ends for defining a differential receiving space and rigidly secured together at said adjacent ends, integral substantially parallel walls extending from one of said axle housing members and enclosing a variable speed transmission gearing space, and an integral wall extending from the other of said axle housing members to cooperate with one of the walls of said transmission housing in defining and enclosing a reduction gear chamber alongside the transmission gearing space and open to said differential receiving space.

2. In a vehicle, a transverse drive axle comprising two housing members enlarged and secured together at adjacent ends to define an intermediate differential receiving space, a transmission housing having parallel end walls and a bottom wall integral with said end walls and one of said housing members, and a reduction gear housing defined by one of said transmission housing end walls and an integral extension of the other of said axle housing members.

References Cited in the file of this patent

UNITED STATES PATENTS

| | | |
|---|---|---|
| 1,032,517 | Torbensen | July 16, 1912 |
| 1,064,213 | Herman | June 10, 1913 |
| 1,292,286 | Faust | Jan. 21, 1919 |
| 1,355,826 | Fawver | Oct. 19, 1920 |
| 1,490,374 | Foote | Apr. 15, 1924 |
| 1,665,470 | Norelius | Apr. 10, 1928 |
| 2,090,123 | Hoffman | Aug. 17, 1937 |
| 2,127,033 | Johnston | Aug. 16, 1938 |
| 2,166,411 | Johnston et al. | July 18, 1939 |
| 2,199,684 | Wilson et al. | May 7, 1940 |
| 2,225,202 | Baker et al. | Dec. 17, 1940 |
| 2,337,609 | Jamieson | Dec. 28, 1943 |
| 2,345,351 | Maxon et al. | Mar. 28, 1944 |
| 2,402,637 | Keese | June 25, 1946 |
| 2,409,526 | Ausherman | Oct. 15, 1946 |
| 2,478,180 | Buckendale | Aug. 9, 1949 |
| 2,510,325 | Anderson | June 6, 1950 |
| 2,625,055 | Cudy | Jan. 13, 1953 |
| 2,647,597 | Keese | Aug. 4, 1953 |

FOREIGN PATENTS

| | | |
|---|---|---|
| 531,369 | France | Oct. 21, 1921 |
| 475,166 | Great Britain | Nov. 15, 1937 |